United States Patent
Chien et al.

(10) Patent No.: US 8,218,612 B2
(45) Date of Patent: Jul. 10, 2012

(54) TIMING ERROR DETECTOR AND METHOD THEREOF

(75) Inventors: Ying-Ren Chien, Taipei (TW); Hen-Wai Tsao, Taipei (TW)

(73) Assignee: National Taiwan University, Taipei (TW)

( * ) Notice: Subject to any disclaimer, the term of this patent is extended or adjusted under 35 U.S.C. 154(b) by 724 days.

(21) Appl. No.: 12/402,506

(22) Filed: Mar. 12, 2009

(65) Prior Publication Data

US 2010/0054318 A1 Mar. 4, 2010

(30) Foreign Application Priority Data

Aug. 27, 2008 (TW) ................................ 97132686 A

(51) Int. Cl.
*H04B 3/46* (2006.01)

(52) U.S. Cl. ........ 375/226; 375/219; 375/316; 375/324; 375/346; 375/354; 375/355; 375/356; 375/364; 375/365; 375/366; 375/373; 375/376; 375/296

(58) Field of Classification Search ................. 375/226, 375/316, 324, 354, 355, 373, 376, 219, 296, 375/346, 364, 365, 366

See application file for complete search history.

(56) References Cited

U.S. PATENT DOCUMENTS

| | | | | |
|---|---|---|---|---|
| 6,049,575 | A * | 4/2000 | Moridi ......................... | 375/355 |
| 6,795,510 | B2 * | 9/2004 | Edde ............................. | 375/326 |
| 6,985,549 | B1 * | 1/2006 | Biracree et al. ............... | 375/355 |
| 7,409,003 | B2 * | 8/2008 | Vaananen et al. ............. | 375/285 |
| 7,920,649 | B2 * | 4/2011 | Shoor et al. .................. | 375/316 |
| 2007/0092047 | A1 * | 4/2007 | Amizic et al. ................ | 375/355 |
| 2009/0168934 | A1 * | 7/2009 | Huang et al. .................. | 375/354 |

OTHER PUBLICATIONS

Ying-Ren Chien, et al. "A Novel Baud-Rate Timing Error Detector Design for Baseband Transmission System Using Tomlinson-Harashima Precoder," IEEE Signal Processing Letters, vol. 15, pp. 673-676, 2008.

* cited by examiner

*Primary Examiner* — Sam K Ahn
*Assistant Examiner* — Sophia Vlahos
(74) *Attorney, Agent, or Firm* — Lin & Associates IP, Inc.

(57) ABSTRACT

An effective data sequence based timing error detector (EDS-TED) for baseband transmission system using Tomlinson-Harashima Precoder is disclosed. The EDS-TED extracts timing error information embedded in the received signal to build up autocorrelation between the ESD signals and minimize the mean square error between the received and desired EDS so as to improve the performance of the TED in terms of Peak-to-Peak Jitter and TED gain. Thus the quality of the received signal increases and the error rate decreases.

18 Claims, 4 Drawing Sheets

TIMING ERROR DETECTOR AND METHOD THEREOF

BACKGROUND OF THE INVENTION

1. Field of the Invention

The present invention relates generally to a timing error detector and a method thereof, and more particularly, to a timing error detector for a baseband transmission system using a Tomlinson-Harashima precoder.

2. The Prior Arts

In a transmission channel of a high speed digital transmission system, there are many unavoidable noise sources, which provide noises interfering clock signals recovered by the receiver side. Such noise interferences may cause large jitters, and therefore the receiver side cannot recover information transmitted from the transmitter side. As such, correct timing error information is very important for a high speed digital transmission system, such as a 10 GBASE-T baseband transmission system. Accordingly, an effective technology of extracting the timing error information is very much desired by a receiver, for overcoming the problem caused by the noise contained in the correct timing error information, thus obtaining the correct timing error information as desired.

Nowadays, data transmission rates are developed to be higher and higher. As such, the system unit interval becomes much shorter. When the system is in operation with a higher data transmission rate, the timing margins of the system are closer to each other. Therefore, the performance of a timing recovery (TR) loop plays a critical role hereby. Typically, a decision feedback equalizer (DFE) includes two parts, a feed-forward equalizer (FFE), and a feedback equalizer (FBE). To solve the error propagation problem, a Tomlinson-Harashima precoder (THP), which is known as a transmitter side pre-equalization technique, has been proposed to move the FBE of the DFE to the transmitter side. The THP is not only capable of avoiding the error propagation problem, but also compatible with the low density parity check (LDPC) codes, thus reducing the impact to the system and lowering the operation risk of the system.

One of the most important blocks in a TR loop is the timing error detector (TED), such as a Mueller and Muller TED (MM-TED) or an equalizer-based TED (EQ-TED). The MM-TED has been widely used in many TR systems. In a typical MM-TED, the output of the TED is determined according to the sampled data and estimated data values. The EQ-TED estimates the timing error information according to the coefficients of the FFE. The EQ-TED does not need any decision results for estimating the timing error, and therefore it can be applied in a receiver for a baseband transmitter using THP.

The present invention is provided as a solution to problems of the conventional MM-TED. In a THP of a baseband transmitter, the THP employs a modular element for restricting the output within a predetermined range, which causes a non-linear effect, and therefore the MM-TED of the baseband communication system using the DFE cannot detect the correct timing error information. Moreover, the conventional EQ-TED has the following disadvantages. Firstly, an optimal first precursor tap weight obtained at an optimal sampling phase is assumed to be known, in that only when an optimal coefficient of the FFE is known, the system can obtain the correct timing error information. Otherwise, the EQ-TED would be biased. Secondly, the estimated timing error is related to the algorithm for dynamically adjusting the FFE coefficient, and accordingly different estimated values of the timing error may be obtained in accordance with different adaptive algorithms.

As such, a timing error detector and a method thereof are desired to provide a solution to the problems associated with the conventional technologies, and thus improving the performance of the entire communication system.

SUMMARY OF THE INVENTION

A primary objective of the present invention is to provide a timing error detector, adapted for a non-linear Tomlinson-Harashima precoder of a transmitter in a baseband communication system, e.g., a 10 GBASE-T system, for extracting correct timing error information from the received signals. In accordance with the present invention, an autocorrelation between effective data sequences (EDS) is constructed, and a mean square error (MSE) between the received and the desired EDS, thus reducing the peak-to-peak jitter of the recovered clock pulse and enhancing the timing error detection gain, and further improving the quality of the received signals at the input of slicers and reducing the error rate thereof.

Another primary objective of the present invention is to provide a method for detecting a timing error, for incorporating with a non-linear Tomlinson-Harashima precoder of a baseband transmitter, and extracting the correct timing error information according to the timing error instant estimation value signals, so as to bypass the non-linear effect caused by the Tomlinson-Harashima precoder, thus improving the signal-to-noise ratio at the input of the slicer.

Further, the preset invention is adapted for a variety of modulation techniques, such as pulse amplitude modulation, and 128-points double square mapping.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
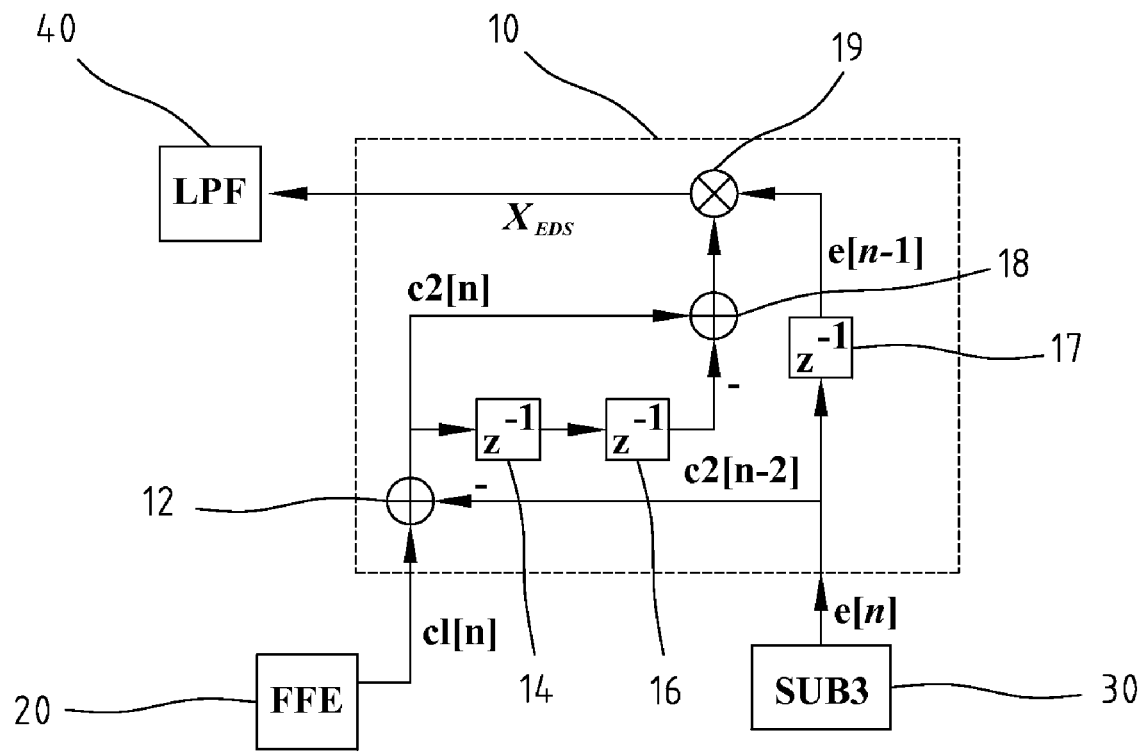
FIG. 1 is a schematic diagram illustrating an effective data sequence timing error detection (EDS-TED) according to an embodiment of the present invention.

FIG. 1 is a schematic diagram illustrating an effective data sequence based timing error detection (EDS-TED) 10 according to an embodiment of the present invention. Referring to FIG. 1, the EDS-TED 10 includes a first subtractor 12, a first delayer 14, a second delayer 16, a third delayer 17, a second subtractor 18, and a multiplier 19. The EDS-TED 10 is adapted for processing an EDS $c1[n]$ of the receiver side and an error signal e[n], and generating an output value $X_{EDS}$. The EDS c1[n] of the receiver side is provided from a feed-forward equalizer (FFE) 20, and the error signal e[n] is provided by a posterior subtractor 30. The output value $X_{EDS}$ is received by a loop filter (LPF) 40. As such, the EDS-TED 10 of the present invention is provided mainly for performing a logical calculation to the EDS c1[n] at the receiver side and the error signal e[n], so as to obtain an output signal of the output value $X_{EDS}$.

The first subtractor 12 subtracts the error signal e[n] from the EDS c1[n] of the receiver side and generates an EDS estimation value c2[n] of the transmitter side. The EDS estimation value c2[n] of the transmitter side is then provided to the first delayer 14 and the second subtractor 18. The EDS estimation value c2[n] of the transmitter side is then delayed by the first delayer 14 and the second delayer 16, thus generating a delayed EDS estimation value c2[n−2] at the receiver side. The second subtractor 18 subtracts the delayed and EDS estimation value c2[n−2] of the transmitter side from the EDS estimation value c2[n], thus obtaining a difference signal c2[n]−c2[n−2], and transmitting the difference signal to the first multiplier 19. The third delayer 17 delays the error signal e[n] and generates a delayed error signal e[n−1]. The first multiplier 19 then multiplies the difference signal with the delayed error signal e[n−1], and obtains the output value $X_{EDS}$. Therefore, the output value $X_{EDS}$ can be represented as:

$$X_{EDS}=e[n-1](c2[n]-c2[n-2]).$$

Figure 2:
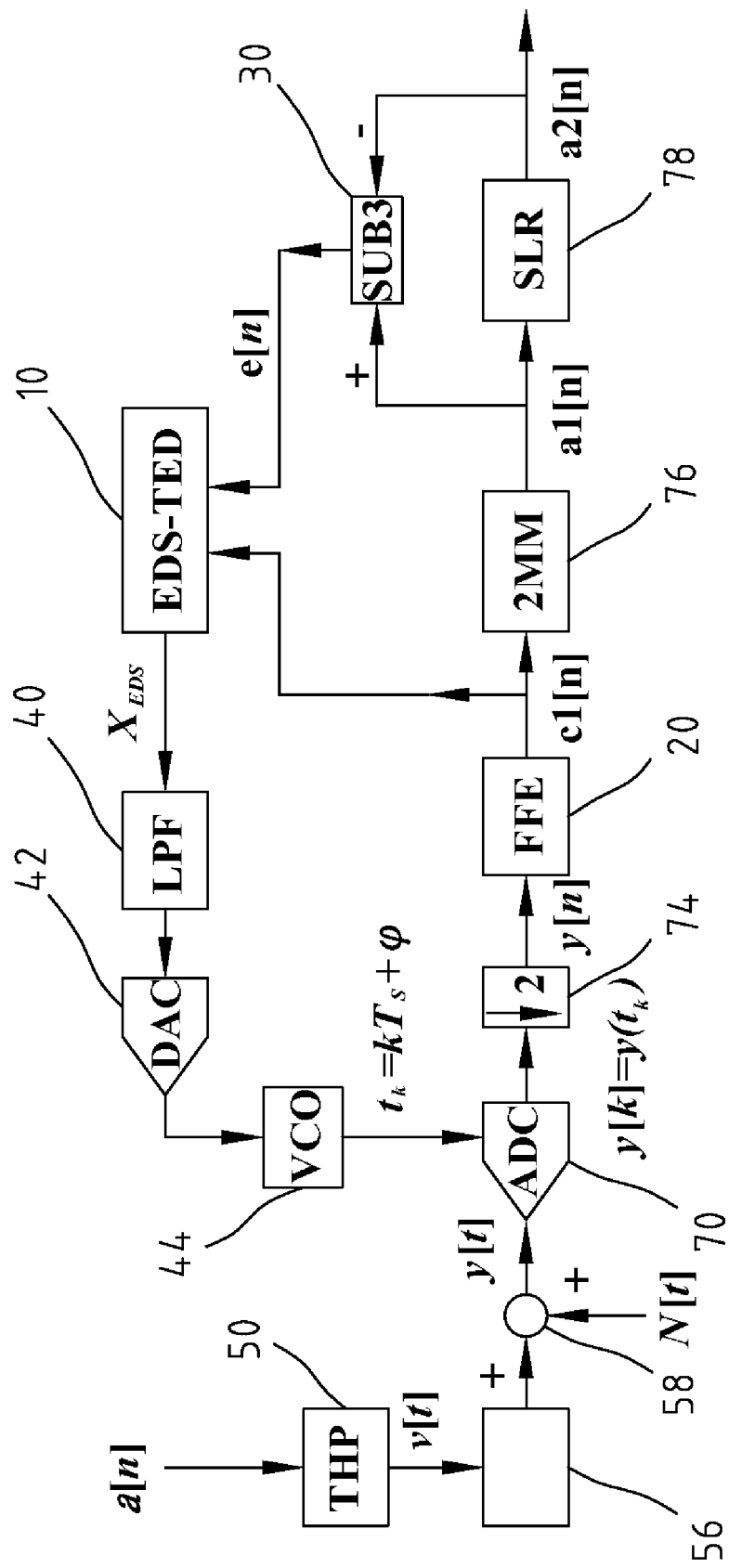
FIG. 2 is a schematic diagram illustrating a baseband communication system having a transmitter side using a THP and a receiver side employing the EDS-TED according to an embodiment of the present invention.

FIG. 2 is a schematic diagram illustrating a baseband communication system with a receiver side employing the EDS-TED of FIG. 1 according to an embodiment of the present invention. Referring to FIG. 2, it illustrates a baseband communication including a Tomlinson-Harashima precoder (THP) 50. The THP 50 is positioned at the transmitter side for precoding information baud-rate signals a[n] (a modulation signal of which has M levels), to generate a precoded channel input signal v[n]. After passing through the transmission channel, the precoded channel input signal v[n] is then received by the receiver side, and therefore a received signal y(t) is generated thereby. As shown in FIG. 2, the adder 58 of the receiver side represents that the transmission channel 56 causes a white Gaussian noise N(t) to be added in the received signal y(t). It should be noted that the adder 58 is used to show that the effect affection applied by the transmission channel to the transmitted signal is equivalent to an adder 58 employed at the receiver side, instead of restricting that the receiver side of the communication system should include such an adder.

The received signal y(t) at the receiver side is converted into a digital input signal $y(t_k)$ by an analog-to-digital converter (ADC) 70. It should be noted that the received signal y(t) is a continuous signal, and the digital input signal $y(t_k)$ is a discrete signal, and therefore y[k] is employed for substituting $y(t_k)$. The ADC 70 requires an external clock signal for sampling to generate y[k]. The sampling period $t_k$ of the ADC can be represented as: $t_k=kTs+\phi$, in which k is a timing subscript, Ts represents a sampling period, $\phi$ represents a sampling phase, while Ts=T/2, and T represents a baud-rate time of the transmission system.

Then, the signal y[k] is operated by a down-sampler 74 having a reduction factor of 2, and a modulation reduction sampled signal y[n] is thus generated. After performing the equalization, the FFE 20 generates the receiver side EDS, c1[n], and at the same time, the receiver side EDS, c1[n], is provided to the EDS-TED 10 and a 2M module (2MM) 76. The EDS-TED 10 executes the foregoing operations to generate the output value $X_{EDS}$, while the modulo-2M device 76 executes a 2M module process to remove the precoding sequence contained therein to obtain a received baud-rate signal a1[n]. In other words, the 2M module 76 is a decoding module. The slicer 78 then receives the received baud-rate signal a1[n], and generates a decision a2[n]. Then, the posterior subtractor 30 subtracts the decision a2[n] from the received baud-rate signal a1[n], and obtains the error signal e[n].

The output value $X_{EDS}$ of the EDS-TED 10 is sequentially processed by the LPF 40, a digital-to-analog converter (DAC) 42, a voltage control oscillator (VCO) 44, and finally the VCO 44 outputs a clock signal $t_k$ to the ADC 70. Accordingly, the EDS-TED 10, the LPF 40, the DAC 42, and the VCO 44 constitute a timing loop in the receiver side for the baseband communication system.

As such, the EDS-TED 10 according to the present invention can extract a suitable difference signal from the timing loop in the receiver side for the baseband communication system, i.e., the output value $X_{EDS}$, so that the timing loop can more effectively output the correct clock signal $t_k$, and therefore the signal-to-noise ratio at the slicer 78 input is maximized.

Figure 3:
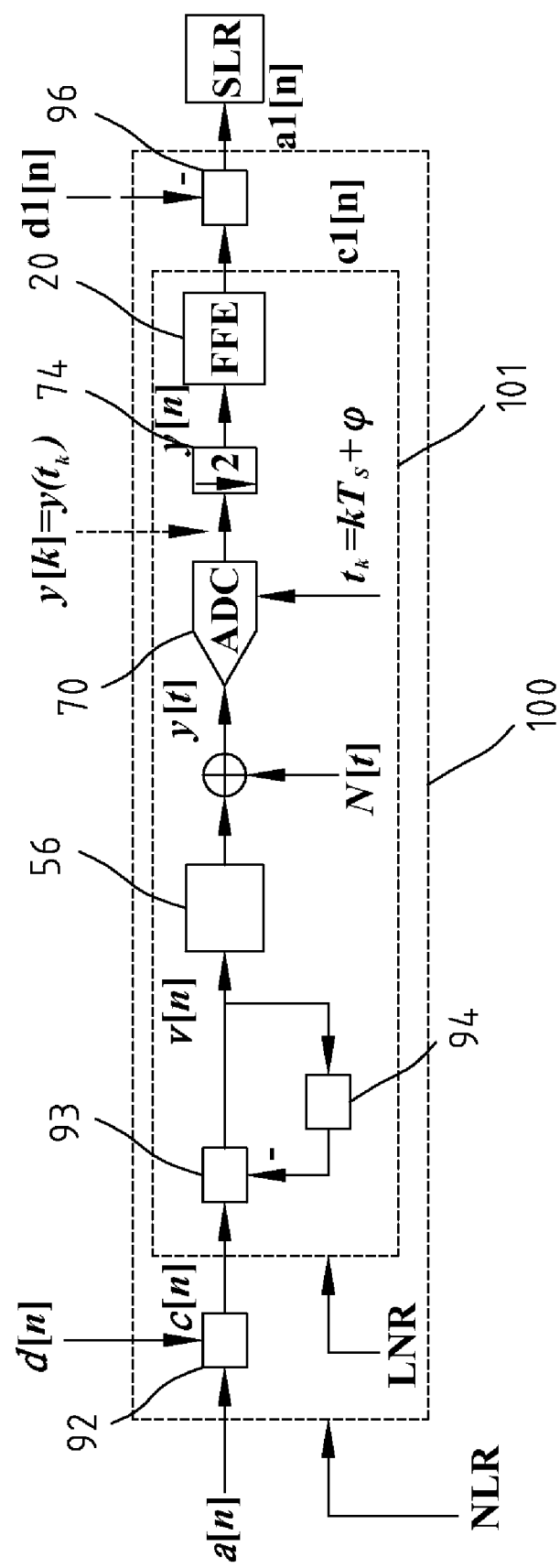
FIG. 3 is a schematic diagram illustrating an equivalent model of a baseband communication system using THP according to an embodiment of the present invention.

For further illustrating the improvement made by the EDS-TED 10 of the present invention to the baseband communication system, please refer to FIG. 3. FIG. 3 is a schematic diagram illustrating an equivalent model of a baseband communication system using THP according to an embodiment of the present invention. As shown in FIG. 3, the equivalent model of the THP is represented by a first adder 92, a fourth subtractor 93, and a feedback loop 94. A precoding sequence d[n] is added by the first adder 92 to an original information baud-rate a[n], thus generating an EDS sequence c[n]. The fourth subtractor 93 and the feedback loop 94 are provided for generating the precoded channel input signal v[n]. According to the simplified model of the THP, the non-linear precoding sequence d[n] is distinguished from other linear blocks, so as to illustrate the advantages of the present invention. The fifth subtractor 96 subtracts a precoding sequence d1[n] from the receiver side EDS, c1[n], so as to generate the received baud-rate signal a1[n] at the input of the slicer 78. The precoding sequence at the transmitter side d[n] and the received precoding sequence at the receiver side d1[n] are both random signals, and therefore they are non-linear physical quantities. The equivalent system to which the original information baud-rate a[n] is inputted, as shown in FIG. 3 and directed by the arrow NLR, is a non-linear system, i.e., the non-linear block 100 as shown in FIG. 3 is a non-linear system. However, the equivalent system to which the EDS c[n] is inputted, as shown in FIG. 3 and directed by the arrow LNR, i.e., the linear block 101 as shown in FIG. 3, is a linear system.

Assuming that the error signal e[n] inputted to the EDS-TED 10 according to the present invention is defined as:

$$e[n]=c1[n]-c[n],$$

because the EDS c[n] is only available at the transmitter side, the receiver side has to estimate the EDS c[n]. In case the decision is correct, i.e., a2[n]=a[n], then:

$$c[n]=a2[n]+d1[n]$$

and therefore $$\begin{aligned} e[n] &= c1[n] - (a2[n] + d1[n]) \\ &= c1[n] - a2[n] - (c1[n] - a1[n]) \\ &= a1[n] - a2[n], \end{aligned}$$

in which d1[n]=c1[n]−a2[n], i.e., the received precoding sequence d1[n] can be obtained by subtracting an output signal of a 2M module 76 from its input signal, which is also subtracting the received baud-rate signal a1[n] from the receiver side EDS c1[n]. Comparing with the definition given to e[n] as shown in FIG. 2, the foregoing assumption is coincident with the structure shown in FIG. 2, i.e., e[n]=a1[n]−a2[n]=c1[n]-c[n]. Because the linear block 101 between the receiver side EDS c1[n] and the precoding information baud-rate signal c[n] is a linear system, a system configuration of the EDS-TED 10 of the present invention can be deducted in accordance with the minimum square error criteria, in which the delay elements are provided for the causality considerations. As such, the design of the timing loop is not affected by the nonlinearity introduced by the THP, and therefore the present invention provides a solution to the nonlinear distortion error introduced by the conventional THP, thus improving the performance of the communication system in its entirety.

It should be noted that the transmitter illustrated in the foregoing embodiments are given for exemplifying the features of the present invention. As such, the present invention is also adapted for other THP transmitter for solving the nonlinearity problem of the THP.

In another embodiment, the present invention further provides a timing error detection method, for providing a solution to the nonlinear distortion problem of the conventional nonlinear THP transmitter, thus allowing the receiver side obtaining the correct data as desired.

Figure 4:
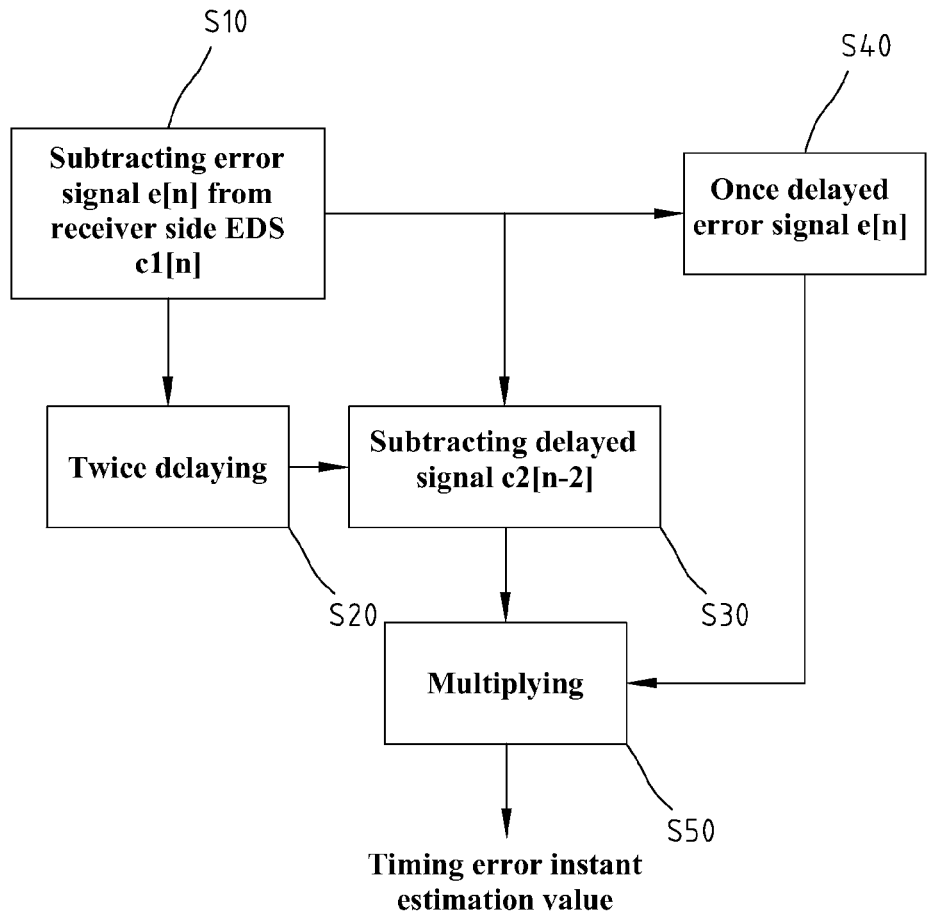
FIG. 4 is a flow chart illustrating a method for detecting a timing error according to an embodiment of the present invention.

FIG. 4 is a flow chart illustrating a method for detecting a timing error according to an embodiment of the present invention. Referring to FIG. 4, first at step S10, a transmitter side EDS estimation value c2[n] is obtained by subtracting an error signal from a receiver side EDS. Then, at step S20, a delayed transmitter side EDS estimation value by performing two times of delaying processes. At step S30, a difference signal is obtained by subtracting the double delayed signal from the original transmitter side EDS estimation value. Then, at step S40 a delayed error signal is obtained by performing a once delaying process to the difference signal. At step S50, a timing error instant estimation value is obtained by multiplying the difference signal with the delayed error signal. A timing error detector constructed according to the method for detecting a timing error can be employed incorporating with a THP for constructing a communication system having a linear timing loop, thus providing a solution to the nonlinear distortion problem of the conventional nonlinear THP transmitter, and improving the communication performance thereof.

Table 1 shows a comparison of the performance of the EDS-TED of the present invention with the conventional MM-TED and EQ-TED. As shown in Table 1, the resulting peak-to-peak jitter, decision-point signal-to-noise ratio (DP-SNR) and the symbol error rate (SER) for the TH precoded system with the EDS-TED of the present invention, the conventional MM-TED and the EQ-TED, respectively, are listed for comparison. Referring to Table 1, when there is no residual frequency offset $\Delta f_s$, the MM-TED operates well. Further, when the residual frequency offset $\Delta f_s$ is too high, the EQ-TED will fail to work since it cannot provide a correct timing error data. On the contrary, when the residual frequency offset $\Delta f_s$ is lower than 20 ppm, the EDS-TED of the present invention can still work well. As such, the TH precoded system with the EDS-TED of the present invention achieves an improved performance in terms of peak-to-peak jitter, DP-SNR, and SER, comparing with the conventional MM-TED and EQ-TED.

TABLE 1

Loop Performance Comparison

| Performance metrics | $\Delta f_s$ (ppm) | MM-TED [3] | EQ-TED [6] | proposed EDS-TED |
|---|---|---|---|---|
| Peak-to-peak jitter (ps) | 0 | 35.10 | 17.40 | 8.81 |
|  | 10 | 1249.98 | 76.50 | 8.49 |
|  | 20 | 1249.98 | 1249.98 | 9.72 |
| DP-SNR (dB) | 0 | 30.35 | 30.44 | 30.49 |
|  | 10 | 22.42 | 29.65 | 30.33 |
|  | 20 | 22.41 | 22.42 | 30.14 |
| SER | 0 | $1.42 * 10^{-3}$ | $1.42 * 10^{-3}$ | $1.42 * 10^{-3}$ |
|  | 10 | $8.58 * 10^{-1}$ | $1.82 * 10^{-3}$ | $1.43 * 10^{-3}$ |
|  | 20 | $9.00 * 10^{-1}$ | $7.73 * 10^{-1}$ | $1.44 * 10^{-3}$ |

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A timing error detector, adapted for generating a timing error instant estimation value with respect to a receiver side effective data sequence (EDS) and an error signal, the timing error detector, together with a loop filter (LPF), a first signal converter, and a voltage control oscillator (VCO) constituting a timing loop employed in a receiver of a communication system that uses a Tomlinson-Harashima precoder (THP) in a transmitter of the communication system, the timing error detector comprising:
    a first subtractor, for obtaining a transmitter side EDS estimation value by subtracting the error signal from the receiver side EDS;
    a first delayer, for generating a first delayed signal by performing a delaying process to the transmitter side EDS estimation value;
    a second delayer, for generating a delayed transmitter side EDS estimation value by performing a delaying process to the first delayed signal;
    a second subtractor, for generating a difference signal by subtracting the delayed transmitter side EDS estimation value from the transmitter side EDS estimation value;
    a third delayer, for generating a delayed error signal by performing a delaying process to the error signal; and
    a first multiplier, for generating the timing error instant estimation value by multiplying the difference signal with the delayed error signal.

2. The timing error detector according to claim 1, wherein the timing error instant estimation value is transmitted to the LPF, the LPF generates a mean time error estimation value, and transmits the mean time error estimation value to the first signal converter, and therefore the first signal converter generates a control signal, and the VCO receives the control signal, and generates a sampling clock signal having a timing constant.

3. The timing error detector according to claim 1, wherein the first signal converter is a digital to analog converter (DAC).

4. The timing error detector according to claim 2, wherein the control signal is an analog control signal.

5. The timing error detector according to claim 1, wherein the communication system further comprises:
    a transmitter side, comprising the THP, for precoding a baud-rate signal by the THP and embedding the baud-rate signal in a precoding sequence, and generating a precoded channel input signal;

a transmission channel, for receiving the precoded channel input signal and generating a transmission signal which is added with channel noise by the transmission channel to form a received signal on a receiver side;

a second signal converter, positioned at the receiver side of the communication system, for receiving the received signal, and converting the received signal into a discrete digital signal according to a sampling clock signal provided by the VCO;

a modulation reduction sampler, for receiving the discrete digital signal from the second signal converter, and performing a modulation reduction to the discrete digital signal with a modulation reduction factor of 2, to obtain a modulation reduction sampled signal;

a feedforward equalizer (FFE), for receiving the modulation reduction sampled signal, and generating the receiver side EDS;

a decoding module, for receiving the receiver side EDS, and removing the precoding sequence to generate a received baud-rate signal;

a slicer, for receiving the received baud-rate signal, and generating an estimation baud-rate signal; and a posterior subtractor, for generating the error signal by subtracting the estimation baud-rate signal from the received baud-rate signal.

6. The timing error detector according to claim 5, wherein the second signal converter is an analog to digital converter (ADC).

7. The timing error detector according to claim 1, wherein the first delayer is a digital D flip-flop.

8. The timing error detector according to claim 1, wherein the second delayer is a digital D flip-flop.

9. The timing error detector according to claim 1, wherein the third delayer is a digital D flip-flop.

10. A timing error detection method, adapted for a timing error detector for generating a timing error instant estimation value by processing a receiver side effective data sequence (EDS) and an error signal, the timing error detector, together with a loop filter (LPF), a first signal converter, and a voltage control oscillator (VCO) constituting a timing loop employed in a receiver of a communication system that uses a Tomlinson-Harashima precoder (THP) in a transmitter of the communication system, the timing error detection method comprising:

generating a transmitter side EDS estimation value by subtracting the error signal from the receiver side EDS;

generating a delayed transmitter side EDS estimation value by performing a twice delaying process to the transmitter side EDS estimation value;

generating a difference signal by subtracting the delayed transmitter side EDS estimation value from the transmitter side EDS estimation value;

generating a delayed error signal by performing a once delaying process to the error signal; and generating the timing error instant estimation value by multiplying the difference signal with the delayed error signal.

11. The timing error detection method according to claim 10, wherein the timing error instant estimation value is transmitted to the LPF, the LPF generates a mean time error estimation value, and transmits the mean time error estimation value to the first signal converter, and therefore the first signal converter generates a control signal, and the VCO receives the control signal, and generates a sampling clock signal having a timing constant.

12. The timing error detection method according to claim 10, wherein the first signal converter is a digital to analog converter (DAC).

13. The timing error detection method according to claim 11, wherein the control signal is an analog control signal.

14. The timing error detection method according to claim 10, wherein the communication system further comprises:

a transmitter side, comprising the THP, for precoding a baud-rate signal by the THP and embedding the baud-rate signal in a precoding sequence, and generating a precoded channel input signal;

a transmission channel, for receiving the precoded channel input signal and generating a transmission signal which is propagated through the transmission channel and is added with channel noise by the transmission channel to form a received signal on a receiver side;

a second signal converter, positioned at the receiver side for the communication system, for receiving the received signal, and converting the received signal into a discrete digital signal according to a sampling clock signal provided by the VCO;

a modulation reduction sampler, for receiving the discrete digital signal from the second signal converter, and performing a modulation reduction to the discrete digital signal with a modulation reduction factor of 2, to obtain a modulation reduction sampled signal;

a feedforward equalizer (FFE), for receiving the modulation reduction sampled signal, and generating the receiver side EDS;

a decoding module, for receiving the receiver side EDS, and removing the precoding sequence to generate a received baud-rate signal;

a slicer, for receiving the received baud-rate signal, and generating an estimation baud-rate signal; and a posterior subtractor, for generating the error signal by subtracting the estimation baud-rate signal from the received baud-rate signal.

15. The timing error detection method according to claim 14, wherein the second signal converter is an analog to digital converter (ADC).

16. The timing error detection method according to claim 10, wherein a digital D flip-flop is used in the twice delaying process to provide a first delay.

17. The timing error detection method according to claim 10, wherein a digital D flip-flop is used in the twice delaying process to provide a second delay.

18. The timing error detector according to claim 10, wherein a digital D flip-flop is used in the once delaying process to provide a third delay.

* * * * *